United States Patent [19]

Yamamoto et al.

[11] 4,405,222
[45] Sep. 20, 1983

[54] MODE SETTING DEVICE FOR CAMERA

[75] Inventors: Hiroshi Yamamoto; Masanori Uchidoi, both of Yokohama; Masaharu Kawamura, Kawasaki, all of Japan

[73] Assignee: Canon Kabushiki Kaisha, Tokyo, Japan

[21] Appl. No.: 273,030

[22] Filed: Jun. 12, 1981

Related U.S. Application Data

[63] Continuation of Ser. No. 73,799, Sep. 10, 1979, Pat. No. 4,307,953.

[30] Foreign Application Priority Data

Sep. 14, 1978 [JP] Japan .................. 53-113052

[51] Int. Cl.³ .............................. G03B 9/64
[52] U.S. Cl. .................. 354/238; 354/289
[58] Field of Search .......... 354/289, 238–240, 354/50, 51, 32–35, 139, 149

[56] References Cited

U.S. PATENT DOCUMENTS

| | | | |
|---|---|---|---|
| 3,956,762 | 5/1976 | Miyamoto | 354/289 |
| 3,964,082 | 6/1976 | Mita | 354/289 |
| 4,021,829 | 5/1977 | Sekida | 354/289 X |
| 4,114,173 | 9/1978 | Tezuka et al. | 354/238 |

Primary Examiner—G. Z. Rubinson
Assistant Examiner—W. J. Brady
Attorney, Agent, or Firm—Toren, McGeady & Stanger

[57] ABSTRACT

A camera exposure mode setting device including a dial which can be moved to select a number of different exposure modes, one of which is controlled by a self-timer circuit in the camera. The device also includes circuitry coupled to the dial which operates to prevent the self-timer circuit from operating unless the dial is maintained in a self-timer exposure mode position. In a preferred embodiment, a push button extends from the dial, the button being arranged to prevent the dial from being moved to select the self-timer mode unless the button is first pushed down by the user.

5 Claims, 7 Drawing Figures

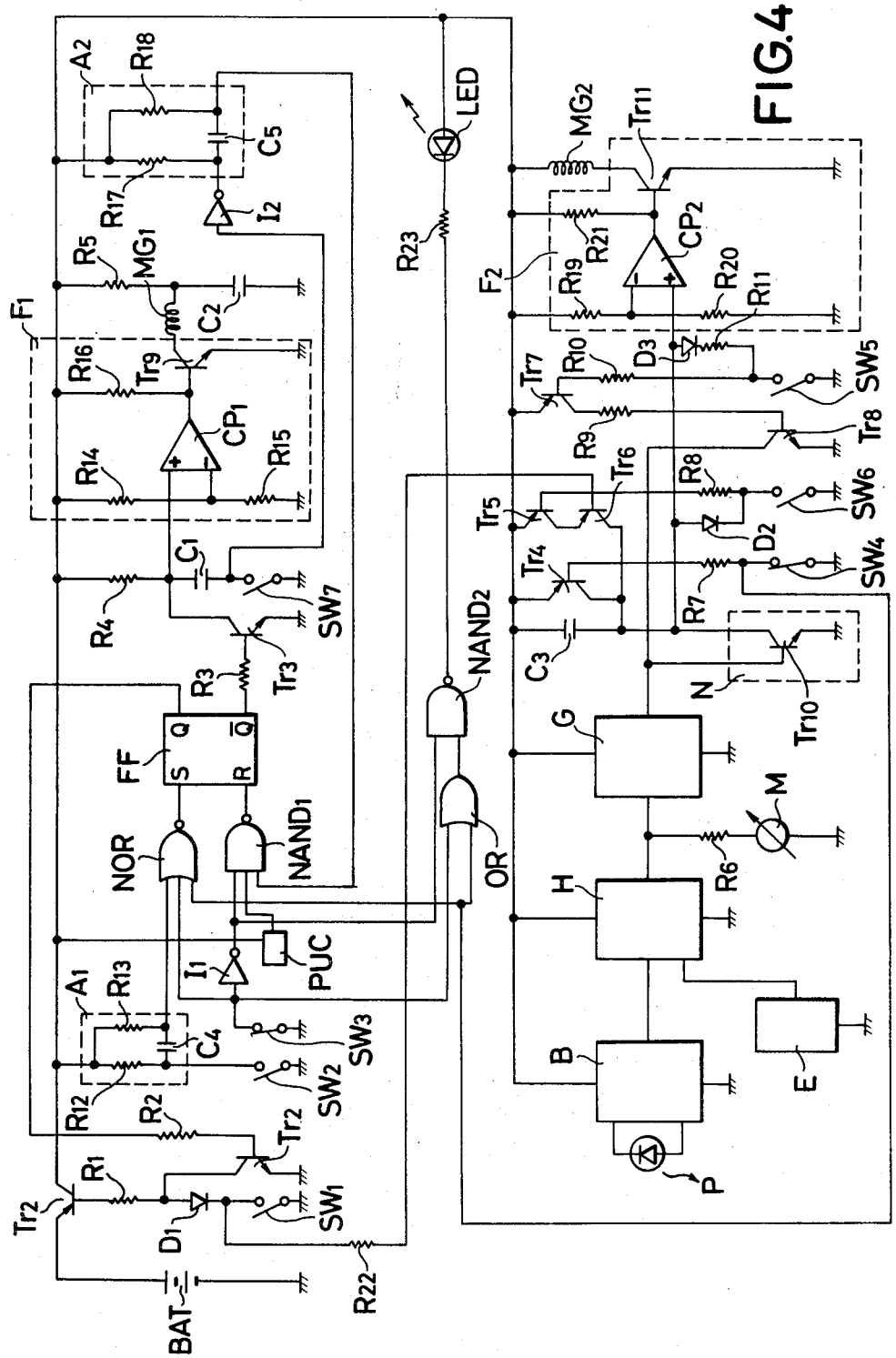

MODE SETTING DEVICE FOR CAMERA

This is a continuation of application Ser. No. 073,799, filed Sept. 10, 1979, now U.S. Pat. No. 4,307,953.

BACKGROUND OF THE INVENTION

1. Field of the Invention

This invention relates to a diaphragm priority automatic exposure camera having an electronic self-timer therein and, more particularly, to a mode setting device for a camera wherein the self-timer mode setting positions are provided on a dial along with exposure modes such as automatic daylight and flash, thereby making it possible to selectively set the automatic daylight, flash and self-timer modes by a single operating member.

2. Description of the Prior Art

In the past, most all of the self-timers for cameras were of the mechanical type, and electronic self-timers were seldom used. Recently, however, due to great advances in the electronics art, it has become possible to construct an automatic exposure control circuit along with a self-timer circuit in the form of a minute integrated circuit device. Thus, a camera provided with an electronic self-timer is now available.

Unlike the camera provided with the mechanical self-timer, the camera provided with an electronic self-timer circuit does not require mechanical components used in the prior mechanical timer and is, therefore, well suited for achieving minimal bulk and size of the camera by eliminating space which would otherwise be occupied by the prior mechanism. In the electronic self-timer type cameras, however, a switch is required for actuating the self-timer circuit, such switch having a member which the camera user can operate to actuate the switch when use of the self-timer circuit is desired.

Conventional cameras of the type having the electronic self-timer have utilized either the camera release button or the electrical power switch control member for the switch actuating member. Since such members are located separately from the mode setting dial which sets the various exposure modes, such as automatic, manual or bulb, setting of a self-timer exposure mode with these cameras is a troublesome operation.

Further, as has been mentioned above, in the conventional cameras having an electronic self-timer circuit, the operating member which sets the self-timer is provided as a separate unit from the mode setting dial which allows selection of the automatic and bulb exposure modes. Accordingly, this results in erroneous operations, such as setting of the bulb exposure mode, while the self-timer has already been set.

SUMMARY OF THE INVENTION

With the foregoing considerations in mind, an object of the present invention is to provide an exposure mode setting device having a single operating member or dial, thereby making it possible to select an automatic exposure mode, a manual exposure mode and a self-timer exposure mode in response to movement of the dial to a corresponding position.

Another object of the present invention is to provide an exposure mode setting device having a dial which is movable between a self-timer exposure mode setting position, and a differently located bulb exposure mode setting position, thereby preventing the bulb exposure mode from being set when the self-timer exposure mode is selected.

Another object of the present invention is to provide an exposure mode setting device in which the individual setting positions for automatic exposure mode, flash exposure mode, self-timer actuated automatic exposure mode, and self-timer actuated flash exposure mode are provided on a single mode setting dial.

For a better understanding of the present invention, reference is made to the following description and accompanying drawing, while the scope of the present invention will be pointed out in the appended claims.

BRIEF DESCRIPTION OF THE DRAWING

FIG. 4 is an electrical schematic diagram illustrating an example of an application of the exposure mode setting device of the present invention to an automatic exposure control system;

DESCRIPTION OF THE PREFERRED EMBODIMENTS

Figure 1:
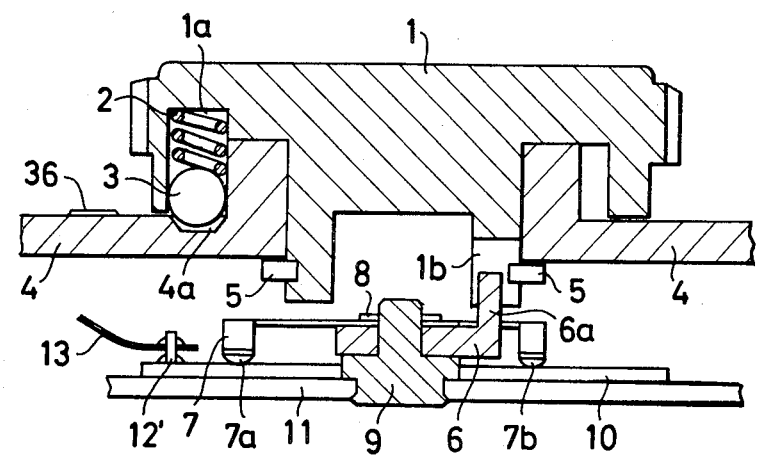
FIG. 1 is a sectional view of one embodiment of a mode setting dial mechanism which comprises a portion of an exposure mode setting device according to the present invention.
Figure 3:
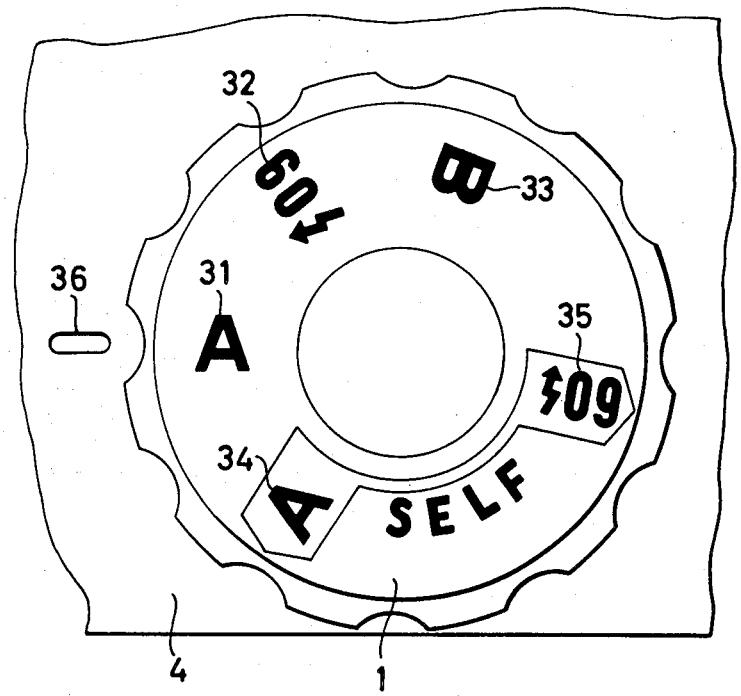
FIG. 3 is a top view of a dial in the mechanism of FIG. 1, the dial having various symbols thereon representing selectable exposure modes.

FIG. 1 shows a mode selection switch mechanism and an operating member therefor which constitute part of a mode setting device according to the present invention. In FIG. 1, a dial 1 is manually operable by a user to selectively set an exposure mode. Printed on the upper surface of the dial, as shown in FIG. 3, are a symbol 31 representing an automatic exposure mode, a symbol 32 representing a shutter time for use in a flash exposure mode, a symbol 33 representing a bulb exposure mode, a symbol 34 representing an automatic self-timer exposure mode, and a symbol 35 representing a self-timer actuated flash exposure mode. As shown in FIG. 1, the dial 1 is provided with a groove 1a in which a coil spring 2 and a click ball 3 are inserted. Click ball 3 is always urged by the coil spring 2 to engage a groove 4a provided in a predetermined position of an upper cover 4 of a camera, so that the dial 1 is adjusted to a selected position by the groove 4a. Fixedly mounted on the outer periphery of the dial 1 is a restraint ring 5, at such a location as to interpose the upper cover 4 between the restraint ring 5 and dial 1. Therefore, the dial 1 is supported for rotatable movement relative to the upper cover 4. A member 6 is rotatably mounted on a shaft 9 which is fixedly mounted on a ground plate 11. Plate 11 is, in turn, fixedly mounted on the camera housing. The member 6 is provided at one end with a projected portion 6a, and the projected portion 6a is inserted into a groove 1b provided in the dial 1, so that the dial 1 and the projected portion 6a engage with each other. Torque is transmitted from the dial 1 to the rotary member 6 through the projected portion 6a of the member 6, thereby causing the member 6 to rotate about the shaft 9. A contact member 7 is fixedly mounted to the rotary member 6, the contact member 7 having sliding contact points 7a and 7b. A pattern substrate 10 is fixedly mounted to the ground plate 11.

Figure 2:
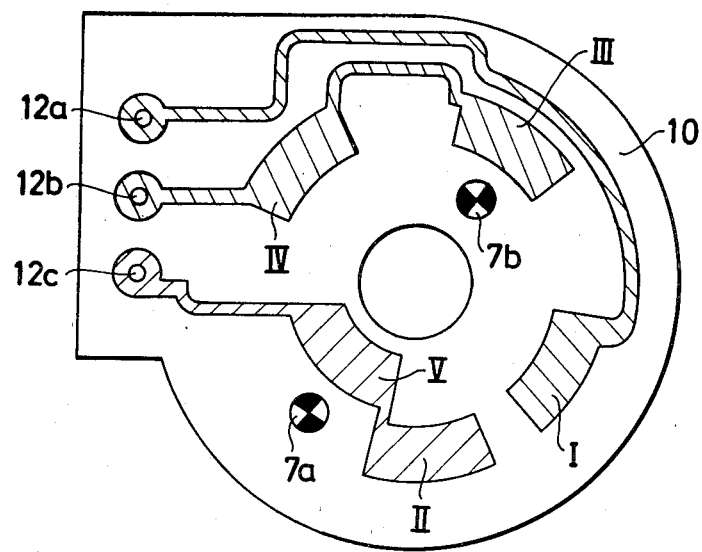
FIG. 2 is a plan view showing an arrangement of electrically conducted patterns on a substrate in the mechanism of FIG. 1.

As shown in FIG. 2, conductive patterns I, II, III, IV and V are arranged on the substrate 10. The above-mentioned ground plate 11 is electrically grounded so that when the contact points 7a and 7b are brought into contact with a conductive pattern, that pattern is also grounded through the shaft 9 and washer 8. On the pattern substrate 10, there are provided terminal portions 12a, 12b and 12c to which respective through-hole pins 12' are soldered, the pins 12' being connected by the way of leads 13 to a control circuit to be described later. Contact points 7a and 7b are slid on the substrate 10 in cooperation with the dial 1, taking positions shown in FIG. 2 when the symbol 31 is registered with an index 36. When the symbol 33 is registered with index 36, the contact point 7a is connected to pattern I. When symbol 32 is registered with index 36, contact point 7a is connected to pattern I. When symbol 34 is registered with index 36, contact 7a is connected to pattern IV. Finally, when symbol 35 is registered with index 36, contact point 7a is connected to pattern III and contact point 7b is connected to pattern V.

FIG. 4 is a schematic diagram of circuitry which associates the exposure mode setting device of the present invention with an exposure control circuit. In the figure, there is shown an electrical power source or battery BAT; a transistor Tr2 for controlling the power supplied from battery BAT to the circuit; a light measurement control switch SW1 arranged to be turned on when a release button (not shown) is depressed over a first distance. The light measurement control switch SW1 is connected through a resistor R1 and a diode D1 to the base of the above-described transistor Tr2 upon closure of switch SW1 to render transistor Tr2 conductive.

A differentiation circuit A1 includes resistors R12, R13 and a condenser C4. Differentiation circuit A1 is connected to a release switch SW2 which is turned on when the release button is depressed over a second distance. When switch SW2 is turned on, the differentiation circuit A1 is energized to provide a pulse. A wind-up completion detecting switch SW3 is arranged to be turned on when the winding operation has been completed, and to be turned off when the rear curtain of the shutter is run downwardly completely. Also provided are a NOR gate and a flip-flop FF having its set terminal S connected to the output of the NOR gate. The inputs of the NOR gate are connected to the respective outputs of the above-described switch SW3, a switch SW4 to be described later, and the differentiation circuit A1, to control transmission of the differentiated pulse from the differentiation circuit A1 to the set terminal S of the flip-flop FF. A NAND gate NAND1 has its output connected to the flip-flop FF at its reset terminal R, and has three inputs connected to the respective outputs of an inverter I1, a power-up clear circuit PUC and a differentiation circuit A2, to be described later. The power-up clear circuit PUC produces a negative pulse when transistor TR2 is turned on to supply the various circuit portions with electrical power. A transistor Tr1 is connected in parallel to switch SW1 to hold the power supply, the base of transistor Tr1 being connected to the output Q of the flip-flop FF through a resistor R2.

A resistor R4 is connected in series with a timing condenser C1 to determine self time, and a switch SW7 which is formed by the above-described patterns III and IV of FIG. 2 and the contact 7a. Switch SW7 is turned on only when the dial 1 is turned to place either of the symbols 34 and 35 in registry with the index 36. A transistor Tr3 has its base connected to the output $\overline{Q}$ of the flip-flop FF through a resistor R3. A level detector F1 includes resistors R14–R16, comparator CP1 and a transistor Tr9. A release magnet MG1 is connected to the collector of transistor Tr9. Magnet MG1 is energized when transistor Tr9 is turned on, thereby actuating a release member (not shown) of the camera. An inverter I2 and a differentiation circuit A2 are also provided, the circuit A2 including resistors R17, R18 and a condenser C5. When the switch SW7 is moved from an ON to an OFF position, the differentiation circuit A2 provides a pulse which changes the output of the NAND gate NAND1 to a high level signal.

A photosensitive element P, such as SPC, is coupled to a light measuring circuit B, known in the art for logarithmically compressing the output of the photosensitive element P. An exposure information signal forming circuit E produces exposure information signals such as those which represent the sensitivity of the film being used, and the preset value of the diaphragm aperture. A computer circuit H of known construction in the art computes the outputs of the light measuring circuit B and the exposure information signal forming circuit E to provide an output (Tv signal) corresponding to a shutter time value. A display meter M coupled to the output of the computer circuit through a resistor R6 displays the output of the circuit H, and a memory circuit G, which is also known in the art, stores the output of the circuit H. A logarithmic elongation circuit N operates to elongate the shutter time signal (Tv signal) provided from the memory circuit G, the circuit N including a transistor Tr10. A shutter time determining condenser C3 is connected to the collector of the transistor Tr10, and a transistor Tr4 is connected in parallel with the condenser C3. The base of transistor Tr4 is connected through a resistor R7 to a switch SW4, switch SW4 being a count switch which is arranged to be turned on when the winding operation has been completed, and to be turned off when the front curtain of the shutter starts to run downwardly. When SW4 is turned off, transistor Tr4 is turned off to enable charging of the condenser C3. A bulb switch SW6 is arranged to be turned on when the symbol 33 on the dial 1 is registered with the index 36. Switch SW6 is formed by pattern I of FIG. 2 and contact 7a. Transistors Tr5 and Tr6 are connected in series with each other, the base of transistor Tr5 being connected through resistor R8 to the switch SW6 so that transistor Tr5 is turned on when switch SW6 is turned on. Also, the base of transistor Tr6 is connected through a resistor R22 to the switch SW1, so that when switch SW1 is turned on, transistor Tr6 is turned on. Transistors Tr5 and Tr6 perform a switching function of short-circuiting condenser C3 when the bulb exposure mode is selected. A diode D2 is also provided between the switched end of resistor R8 and the collector of transistor Tr10.

A flash exposure switch SW5 is connected to one end of a resistor R11, register R11 having a resistance value corresponding to, for example, 1/60 second. When switch SW5 is turned on, resistor R11, together with condenser C3, constitute a timing circuit for the flash exposure mode. Switch SW5 is formed by patterns II, V of FIG. 2, and the contacts 7a and 7b, and is turned on when either of the symbols 32 and 35 is registered with the index 36.

Also provided are transistors Tr7 and Tr8, a resistor R9 being coupled between the collector of Tr7 and the base of Tr8, and a resistor R10 being coupled between the base of Tr7 and the switched end of resistor R11. A level detector F2 operates to detect the voltage charged on condenser C3, and includes resistors R19, R20, R21, a comparator CP2, and a transistor Tr11. A magnet MG2 is coupled to the collector of Tr11, magnet MG2 operating to hold the rear curtain of the shutter. Upon de-energization, a latching member (not shown) for the rear curtain is actuated to permit the rear curtain to run downwardly. A circuit for detecting an abnormal condition of the count switch SW4 and displaying such condition includes an OR gate; NAND gate NAND2; resistor R23; and a light-emitting diode LED.

Operation of the mode setting device of FIGS. 1-4 now follows, explanation first being given to the automatic daylight exposure mode. It will be assumed that the camera is in the cocked position wherein switches SW3 and SW4 are closed. In this condition, when the dial 1 is turned to position he symbol 31 in registry with index 36, the contacts 7a and 7b are positioned at such locations relative to the patterns as shown in FIG. 2, thereby turning off switches SW5, SW6 and SW7. After the desired mode has been selectively set in such a way by the dial 1, and a release button (not shown) is depressed, switch SW1 is turned on when the button is depressed a first distance thereby turning on transistor Tr2 to supply the various circuit portions with electrical power. Such conduction of transistor Tr2 also causes the power up clear circuit PUC to be actuated and provide a negative pulse to the NAND gate NAND1. Gate NAND1 then produces a positive pulse which is applied to the reset terminal R of the flip-flop FF. Thus, flip-flop FF is reset by the negative pulse fromm the power up clear circuit PUC, and changes its Q output to a low level and its $\bar{Q}$ output to a high level signal. Thereafter, when the release button is further depressed a second distance, switch SW2 is turned on to actuate the differentiation circuit A1, and a negative pulse is applied to the NOR gate at one input thereof. However, at this time, the other input of the NOR gate is supplied with a low level signal from the closed switches SW3 and SW4. Thus, in response to the negative differentiated pulse from the circuit A1, the NOR gate produces a positive pulse which is applied to the set terminal S of the flip-flop FF, thereby setting the flip-flop. A high level signal is thereby provided from the Q output terminal of the flip-flop, and a low level signal from its $\bar{Q}$ output terminal. Then, transistor Tr1 is turned on to sustain the conduction of the power supply control transistor Tr2, regardless of whether or not the switch SW1 is turned on. The low level signal from the Q output terminal of flip-flop FF also causes transistor Tr3 to be turned off, thus causing the input at the positive terminal of comparator CP1 to be at a voltage almost equal to the voltage of the battery BAT. Accordingly, comparator CP1, in response to the further depression of the release button, immediately produces a high level signal by which transistor Tr9 is rendered conductive to discharge an accumulated charge on capacitor C2 through the magnetic winding MG1, thereby initiating release of the camera mechanism. Since the light measuring circuit B, on the other hand, was rendered operative by the first depression of the release button to provide an output signal representing the level of brightness of the object being photographed, and the computer circuit H in response to the outputs of the light measuring circuit B and the exposure factor setting circuit E provides an output representing an exposure value, in this instance, an exposure time, just before a mirror within the camera is flipped upward, the exposure time signal Tv is stored in the memory circuit G. Then, the front curtain of the shutter runs downwardly to initiate exposure of the camera film (not shown). At the same time, switch SW4 is turned off to render transistor Tr4 non-conductive, thereby allowing capacitor C3 to begin charging. In further detail, transistor Tr10 logarithmically elongates the signal Tv stored in the memory circuit G, and allows for a collector current flow corresponding to the elongated Tv signal. When transistor Tr4 is turned off, therefore, capacitor C3 is charged with this collector current. As the potential at the positive input terminal of comparator CP2 is gradually lowered, comparator CP2 is inverted in a time corresponding to the effective shutter time, thereby turning off transistor Tr11 to de-energize the magnetic winding MG2. The rear curtain of the shutter is then released from its latched connection to terminate the exposure.

An explanation of the flash exposure mode will now be given. In this case, the symbol 32 on the dial 1 is brought into registry with the index 36, thereby rotating the member 6 in FIG. 1 in a counterclockwise direction. Also, the contact member 7 is turned in the counterclockwise direction to contact with pattern II. Thus, switch SW5 is turned on.

Thereafter, when the camera release button is fully depressed over the above-mentioned first and second distances, the magnetic winding MG2 is energized in a manner similar to that described in connection with the automatic daylight mode. Since switch SW5 is closed as mentioned above, the exposure time depends on the resistance value of resistor R11. In further detail, the closure of SW5 causes conduction of transistors Tr7 and Tr8 which, in turn, causes the potential at the base of transistor Tr10 to be maintained at a level almost equal to zero, thereby turning transistor Tr10 off. As the front curtain of the shutter runs downwardly, and switch SW4 remains off, the short-circuit provided across capacitor C3 by transistor Tr4 is opened, permitting capacitor C3 to be charged through diode D3 and resistor R11 and switch SW5. Therefore, in a time corresponding to the value of the resistor R11, comparator CP2 is inverted to deenergize the magnetic winding MG2. Accordingly, the flash exposure mode operates with a fixed shutter time inasmuch as the resistance value of resistor R11 is predetermined to effect a desired shutter time suitable for use with a flash exposure.

The bulb exposure mode will now be explained. In this case, the symbol 33 on the dial 1 is registered with the index 36. During this setting operation, contact point 7a in FIG. 2 is rotated in the counterclockwise direction, touching pattern I. Thus, switch SW6 is turned on. After switch SW1 is turned on by the first depression of the release button, transistors Tr5 and Tr6 are held in an ON state. Because of this, even when the front shutter curtain is released and transistor Tr4 is turned off, charging of capacitor C3 does not occur, and latching of the rear shutter curtain continues until the force exerted on the release button to depress it is removed. In other words, as long as the release button is depressed, transistors Tr5 and Tr6 retain their ON state while simultaneously permitting the magnetic winding MG2 to be energized. When the release button is no longer depressed, switch SW1 is turned off, and transistors Tr5 and Tr6 are also turned off. Then, capacitor C3 is charged through diode D2 and switch SW6. Thus, comparator CP2 is inverted as soon as the release button is returned to its initial position, and the magnetic winding MG2 is de-energized to terminate exposure of the film.

The self-timer exposure mode will now be explained, the automatic exposure operation being discussed first. In this case, the symbol 34 on dial 1 is placed in registry with index 36, thereby rotating the contact member 7 in the clockwise direction from the position shown in FIG. 2 to a position where contact 7a contacts the pattern IV, thereby closing the switch SW7. Therefore, when the release button is further depressed over the second distance, transistor Tr3 is turned off, and capacitor C1 is charged through resistor R4 and switch SW7. In a time corresponding to the resistance value of resistor R4, comparator CP1 is inverted to energize the magnet MG1 to actuate release of the camera shutter. Therefore, in this case, actuation of the shutter release is effected after the elapse of a predetermined time from the depression of the release button. After this time elapses, automatic exposure operation proceeds, as explained in detail above. Accordingly, an exposure is effected in the self-timer actuated automatic exposure mode.

To interrupt the self-timer operation, the operator need only turn the dial 1 to place the symbol 31 in registry with the index 36, thereby rotating contacts 7a and 7b to the positions illustrated in FIG. 2, and turning SW7 off. Then, the output of inverter I2 changes from a high to a low level, causing the differentiation circuit A2 to produce a negative pulse which, after having been converted to a positive pulse by gate NAND1, is applied to the flip-flop FF. As flip-flop FF is reset, transistor Tr1 is turned off to terminate the duration of the self-holding power supply. Transistor Tr3 is also actuated for conduction, causing a voltage of almost zero to appear at the positive input terminal of comparator CP1. Therefore, comparator CP1 continues to produce a low level signal, and transistor TR9 remains in a non-conducting state. Thus, magnetic winding MG1 is left de-energized, and the exposure control circuit will remain unactuated.

Next, the self-timer actuated flash exposure mode is discussed. When the dial 1 is turned to place the symbol 35 in registry with the index 36, contact point 7a is brought into contact with the pattern III, and contact 7b with pattern V, thereby turning switches SW5 and SW7 on. In this case, therefore, as in the daylight mode, the magnetic winding MG1 will be energized after a time determined by the value of the resistor R4 once the release button is depressed. A flash exposure is then initiated, the exposure time being controlled to a fixed value determined by the resistor R11, as explained in detail above. It should be noted that, even in this mode, when the dial 1 is turned after self-timer operation begins to a position where symbol 31 is registered with the index 36, the self-timer mode operation will terminate.

Figure 7:
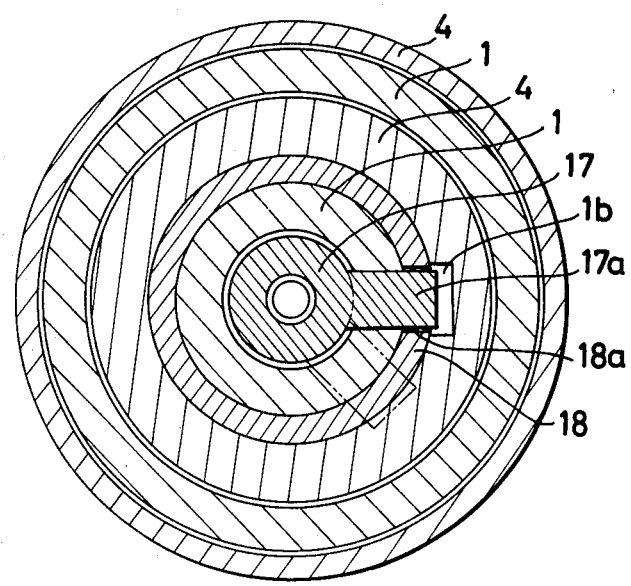
FIG. 7 is a sectional view taken along line B—B' in FIG. 5.
Figure 5:
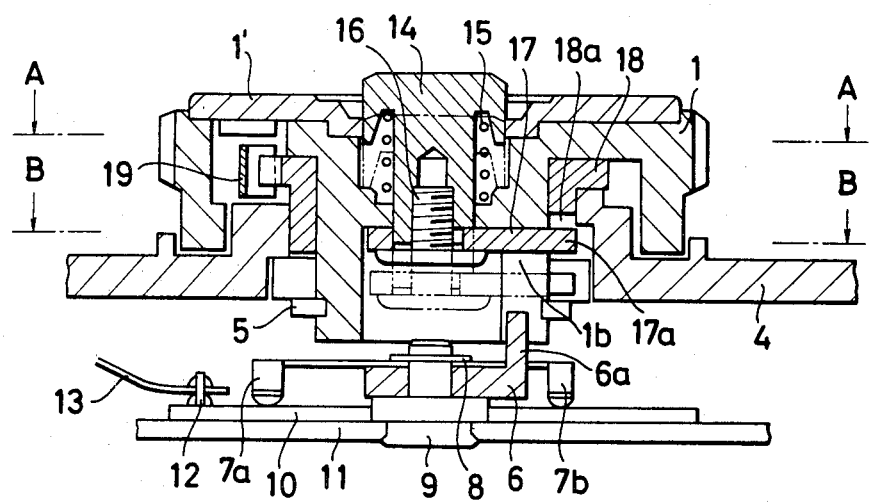
FIG. 5 is a sectional view showing another embodiment of the device of the present invention.
Figure 6:
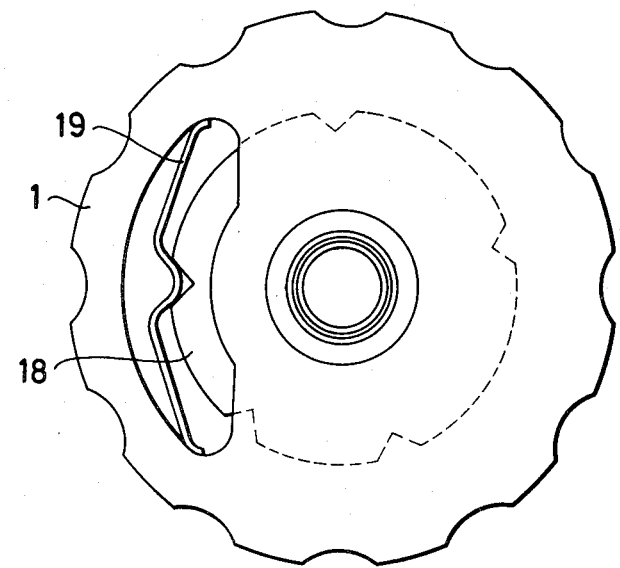
FIG. 6 is an elevational view showing a click mechanism including a leaf spring in the embodiment of FIG. 5.

FIG. 5 is a sectional view of another embodiment of a mode setting dial mechanism according to the present invention, this mechanism being similar to that shown in FIG. 1 so that the same reference numerals have been employed to identify parts similar to those shown in FIG. 1. In FIG. 5, a display disc 1' is securely mounted on the mode setting control dial 1, and having similar symbols to those of FIG. 3 printed on the upper surface thereof. A push button 14 extends from a recessed central opening in the dial 1, the push button 14 being urged upwardly by a spring 15. The push button 14 is arranged to be movable in the vertical direction independently of the dial 1, and to rotate in unison with the dial 1. A screw fastener 16 serves to secure a lock member 17 to the bottom of push botton 14. A bushing 18 is securely mounted on the upper cover 4, bushing 18 being provided with a groove 18a, as shown in FIG. 7.

The lock member 17 is provided with a lock pawl 17a which is arranged to engage groove 18a when the symbol 31 is registered with index 36, i.e., when the automatic exposure mode is selected. Lock member 17 is thereby restrained from rotation as shown in FIG. 7. Groove 1b is provided in dial 1, and the lock pawl 17a engages the groove 1b as shown in FIG. 7, so that the dial 1 and lock member 17 are engaged with each other by way of the engagement of pawl 17a with groove 1b. When the symbol 31 is registered with the index 36, the lock member is restrained from rotation by engagement of pawl 17a with groove 18a, and dial 1 itself is restrained from rotation.

When the push button 14 is depressed, lock member 17 is moved downward to a position illustrated by dashed lines in FIG. 5, wherein the lock pawl 17a is disengaged from the groove 18a. Dial 1 is thereby rendered rotatable. A projecting portion of rotary member 6 engages groove 1b of the dial 1 upon rotation of the dial so that member 6 moves therewith to slidingly move contacts of contact member 7 on the pattern substrate 10 in the manner represented by FIG. 1. A leaf spring 19 is arranged to be urged against the bushing 18 upon engagement with a V-shaped notch provided in bushing 18, thereby operating to position the dial 1. In accordance with the above construction, the mechanism of FIG. 5 avoids accidental changing of exposure modes from occurring due to inadvertent movement of the dial 1.

As has been described in detail, in the mode setting device according to the present invention, a self-timer mode is provided on a mode setting dial for selecting an automatic exposure mode, bulb exposure mode and flash exposure mode, the self-timer modes of operation also being selectable with ease, thereby substantially improving and facilitating the overall use of a camera. When a self-timer exposure mode is selected, it is impossible to select a bulb exposure mode. False operation which would otherwise result by selection of the bulb exposure mode once a self-timer exposure mode has been selected is thereby prevented.

While the foregoing description and drawing represent the preferred embodiments of the present invention, it will be obvious to those skilled in the art that various changes and modifications may be made therein without departing from the true spirit and scope of the present invention.

What is claimed is:
1. A camera comprising:
 (a) a camera body;
 (b) a mode setting dial rotatably mounted on said camera body and having a plurality of symbols, each one of said symbols representing an exposure mode, said symbols including a first symbol corresponding to automatic exposure controlled photography and a second symbol corresponding to auto- matic exposure controlled photography after a certain time delay;
(c) a fixed index on the camera body for selectively registering with said first and said second symbols;
(d) a shutter release member;
(e) a control circuit including a light measuring circuit, an automatic exposure control circuit for controlling an exposure on the basis of an output of said light measuring circuit, an electromagnetic release circuit for starting an exposure operation and for placing said automatic exposure control circuit in an operative state after said electromagnetic release circuit becomes operative, and a self-timer circuit connected to said electromagnetic release circuit wherein said electromagnetic release circuit becomes operative in response to an output from said self-timer circuit;
(f) a first switch coupled to said shutter release member for actuating said electromagnetic release circuit; and
(g) a second switch coupled to said mode setting dial, said second switch arranged to be in a first state when said first symbol is registered with said index and arranged to be in a second state when said second symbol is registered with said index, wherein said second switch is coupled to said self-timer circuit for holding said self-timer circuit in an inoperative state when said second switch is in said first state, and for enabling said self-timer circuit to be actuated by operation of said first switch when said second switch is in said second state, said second switch preventing a response by said release circuit to said first switch when said second switch is in said second state.

2. A mode setting device for a camera, comprising:
(a) a camera body;
(b) a mode setting dial rotatably mounted on the camera body, said dial having a plurality of symbols thereon wherein each symbol represents an operating mode;
(c) a pattern substrate arranged co-axially with said dial, said substrate including a plurality of conductive patterns thereon;
(d) a conductive contact member arranged to slide on said substrate in response to movement of said dial so that a certain potential can be applied to said contact member for placing the potential of the pattern in contact with said contact member at the same level as that applied to said contact member; and
(e) a control circuit connected to said conductive patterns for detecting the potential of said conductive patterns for enabling exposure control in a mode corresponding to the pattern to which the same potential as that of said contact member is applied by said contact member.

3. A camera comprising:
(a) a camera body;
(b) a mode setting dial rotatably mounted on said camera body, said dial having thereon a first symbol for self-timer photography and a second symbol for bulb photography;
(c) a fixed index on said camera body for selectively registering with said first and said second symbols on said dial;
(d) a shutter release member;
(e) a control circuit including:

(i) a shutter time signal forming circuit for producing a shutter time signal;
(ii) a shutter time control circuit for controlling shutter time on the basis of said shutter time signal;
(iii) a shutter closing magnet operative to close a shutter in response to an output from said shutter time control circuit;
(iv) an electromagnetic release circuit for starting an exposure operation, wherein said shutter time control circuit becomes operative after said electromagnetic release circuit becomes operative; and
(v) a self-timer circuit connected to said electromagnetic release circuit, wherein said release circuit becomes operative in response to an output from said self-timer circuit;
(f) a first switch having a first state and a second state, said first switch being placed in said second state from said first state by operation of said shutter release member, wherein said electromagnetic release circuit becomes operative when said first switch is placed in said second state;
(g) a second switch coupled to said mode setting dial, said second switch having a first state and a second state, said second switch being placed in said first state when said first symbol on said mode setting dial is registered with said fixed index; and
(h) a third switch coupled to said mode setting dial, said third switch having a first state and a second state, said third switch being placed in said first state when said second symbol is registered with said fixed index;
wherein said second switch is coupled to said self-timer circuit for placing said self-timer circuit in an operative state only when said second switch is in its first state and said first switch is in its second state, said second switch preventing a response by said electromagnetic release circuit to said first switch when said second switch is in its first state, and wherein said third switch operates to place said shutter time control circuit in an inoperative state only when said third switch is in its first state, said third switch enabling said first switch to actuate said shutter closing magnet to close said shutter as said first switch is placed in its first state from its second state and when said third switch is in its first state.

4. A camera according to claim 3, including a pattern substrate coaxially arranged with said mode setting dial, a first conductive pattern and a second conductive pattern provided on said substrate, a brush arranged to slide on said substrate in response to movement of said dial wherein a certain potential is applied to said brush, said first conductive pattern and said brush being arranged to contact each other when said first symbol is registered with said fixed index for bringing the potential of said first conductive pattern to the same level as the potential of said brush, said second conductive pattern and said brush being arranged to contact each other when said second symbol is registered with said fixed index for bringing the potential of said second conductive pattern to the same level as the potential of said brush, said first conductive pattern forming a part of said second switch and said second conductive pattern forming a part of said third switch.

5. A camera comprising:
(a) a camera body;
(b) a mode setting dial rotatably mounted on said camera body and having thereon a first symbol for a first operating mode wherein automatic exposure control is provided after a certain time delay, a second symbol corresponding to an automatic exposure control operating mode, and a third symbol corresponding to a bulb photography operating mode;

(c) a fixed index on said camera body for selectively registering said first, said second and said third symbols;

(d) a signal circuit for producing a first signal to select said first operating mode when said first symbol is registered with said fixed index, for producing a second signal to select said automatic exposure control when said second symbol is registered with said fixed index, and for producing a third signal to select said bulb photography operating mode when said third symbol is registered with said fixed index; and (e) an exposure control circuit coupled to said signal circuit for providing automatic exposure control, said exposure control circuit including a self-timer circuit operative to provide said first operating mode wherein automatic exposure control is provided after said certain delay time in response to said first signal, said exposure control circuit being arranged to prevent automatic exposure control operation in response to said third signal to select said bulb photography operating mode, wherein automatic exposure control is provided without said delay time in response to said second signal.

* * * * *